United States Patent
Krauss

(10) Patent No.: US 11,174,895 B2
(45) Date of Patent: Nov. 16, 2021

(54) BEARING FOR A WIND TURBINE DRIVETRAIN HAVING AN ELASTOMER SUPPORT

(71) Applicant: General Electric Company, Schenectady, NY (US)

(72) Inventor: Thomas Krauss, Lingen (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/399,022

(22) Filed: Apr. 30, 2019

(65) Prior Publication Data

US 2020/0347880 A1  Nov. 5, 2020

(51) Int. Cl.

| F16C 17/02 | (2006.01) |
|---|---|
| F16C 27/06 | (2006.01) |
| F03D 80/70 | (2016.01) |
| F16C 33/12 | (2006.01) |
| F16H 57/08 | (2006.01) |
| F03D 15/00 | (2016.01) |

(52) U.S. Cl.
CPC .............. *F16C 27/06* (2013.01); *F03D 15/00* (2016.05); *F03D 80/70* (2016.05); *F16C 17/02* (2013.01); *F16C 33/125* (2013.01); *F16H 57/082* (2013.01); *F05B 2240/50* (2013.01); *F16C 2202/08* (2013.01); *F16C 2360/31* (2013.01); *F16C 2361/61* (2013.01)

(58) Field of Classification Search
CPC ........ F16C 17/02; F16C 27/00; F16C 33/125; F16C 33/201; F16C 2202/08; F16C 2360/31; F16C 2361/61; F16C 2208/02; F16C 2208/04; F16C 2208/10; F03D 15/00; F03D 80/70; F16H 57/082; F16H 2057/085; F05B 2240/50
USPC ......... 384/125.215, 280–282, 296–297, 428, 384/536, 907.1, 91, 129, 322, 911; 475/160
See application file for complete search history.

(56) References Cited

U.S. PATENT DOCUMENTS

| 2,498,420 | A | * | 2/1950 | Hemmeter | ............ | D06F 37/245 |
|---|---|---|---|---|---|---|
| | | | | | | 68/23.2 |
| 2,608,451 | A | * | 8/1952 | Pierce, Jr. | ............. | F16C 27/066 |
| | | | | | | 384/536 |
| 3,241,892 | A | * | 3/1966 | Oishei | .................. | B60S 1/3493 |
| | | | | | | 384/222 |

(Continued)

FOREIGN PATENT DOCUMENTS

| CN | 103388641 | A | * | 11/2013 | ................ | F16F 1/38 |
|---|---|---|---|---|---|---|
| EP | 1184567 | A2 | | 3/2002 | | |

(Continued)

OTHER PUBLICATIONS

European Search Report, dated Oct. 16, 2020, for EP Application No. 20171373.2.

*Primary Examiner* — Marcus Charles
(74) *Attorney, Agent, or Firm* — Dority & Manning, P.A.

(57) ABSTRACT

A bearing assembly for a drivetrain of a wind turbine includes at least one shaft having a circumferential outer surface and a bearing secured circumferentially around the circumferential outer surface of the shaft(s). Further, the bearing assembly includes an elastomer support arranged on at least one of an inner surface or an outer surface of the bearing. The elastomer support is constructed, at least in part, of an elastomeric material.

9 Claims, 8 Drawing Sheets

(56) References Cited

U.S. PATENT DOCUMENTS

| | | | | |
|---|---|---|---|---|
| 3,545,900 | A * | 12/1970 | Viner | F16C 33/16 418/131 |
| 4,252,385 | A * | 2/1981 | Leitzel | F16C 33/74 384/138 |
| 4,663,810 | A * | 5/1987 | Kramer | B63H 23/326 264/258 |
| 4,717,268 | A * | 1/1988 | Orkin | F16C 33/28 384/280 |
| 4,867,889 | A * | 9/1989 | Jacobson | C10M 169/04 508/106 |
| 5,056,938 | A * | 10/1991 | Ahlman | F16C 17/18 384/286 |
| 5,372,430 | A * | 12/1994 | Orndorff, Jr. | B63H 23/326 384/116 |
| 5,373,637 | A * | 12/1994 | Harris | B23P 15/003 29/458 |
| 8,021,051 | B2 * | 9/2011 | James | B60G 21/0551 384/276 |
| 8,152,380 | B2 * | 4/2012 | Lien | B60G 21/0551 139/383 A |
| 8,414,448 | B2 * | 4/2013 | Madge | F16H 57/0479 475/348 |
| 8,491,194 | B2 * | 7/2013 | Hagan | F16C 17/02 384/280 |
| 8,591,371 | B2 * | 11/2013 | Dinter | F03D 80/70 475/160 |
| 8,790,213 | B1 * | 7/2014 | Isayama | F16C 17/02 475/346 |
| 8,967,870 | B2 * | 3/2015 | Ishii | F16C 33/208 384/297 |
| 9,022,656 | B2 * | 5/2015 | Burgeff | F16C 33/201 384/276 |
| 9,410,577 | B2 * | 8/2016 | Brodbeck | F01L 1/46 |
| 9,416,867 | B2 * | 8/2016 | Van Den Donker | F16C 17/107 |
| 9,797,378 | B2 | 10/2017 | Pedersen et al. | |
| 10,436,249 | B2 * | 10/2019 | Hoelzl | F16C 33/1055 |
| 10,451,176 | B2 * | 10/2019 | Hoelzl | F16H 57/082 |
| 2005/0276530 | A1 | 12/2005 | Chen et al. | |
| 2011/0309628 | A1 * | 12/2011 | Corts | F16C 17/06 290/55 |
| 2012/0051915 | A1 * | 3/2012 | Suzuki | F03D 80/70 416/170 R |
| 2012/0108380 | A1 * | 5/2012 | Dinter | F16C 33/1055 475/159 |
| 2012/0228878 | A1 * | 9/2012 | Perner | F03B 13/264 290/54 |
| 2013/0071246 | A1 | 3/2013 | Kari et al. | |
| 2014/0133985 | A1 * | 5/2014 | Mongeau | F16C 17/02 416/95 |
| 2014/0161614 | A1 * | 6/2014 | Vervoorn | F03D 7/0224 416/148 |
| 2015/0017000 | A1 * | 1/2015 | Sato | F16C 41/004 416/174 |
| 2016/0245390 | A1 | 8/2016 | Mitsch | |
| 2018/0030964 | A1 | 2/2018 | Eriksen et al. | |
| 2018/0305506 | A1 * | 10/2018 | Henssler | C08J 5/042 |

FOREIGN PATENT DOCUMENTS

| | | | |
|---|---|---|---|
| EP | 2565475 A2 | 3/2016 | |
| EP | 3460269 A1 | 3/2019 | |
| FR | 2393974 A1 | 1/1979 | |
| JP | 2006183768 A * | 7/2006 | F16F 1/38 |
| WO | WO2018/212657 A1 | 11/2018 | |

* cited by examiner

BEARING FOR A WIND TURBINE DRIVETRAIN HAVING AN ELASTOMER SUPPORT

FIELD

The present disclosure relates in general to wind turbines, and more particularly to journal bearings for a wind turbine drivetrain having an elastomer support.

BACKGROUND

Generally, a wind turbine includes a tower, a nacelle mounted on the tower, and a rotor coupled to the nacelle. The rotor generally includes a rotatable hub and a plurality of rotor blades coupled to and extending outwardly from the hub. Each rotor blade may be spaced about the hub so as to facilitate rotating the rotor to enable kinetic energy to be converted into usable mechanical energy, which may then be transmitted to an electric generator disposed within the nacelle for the production of electrical energy. Typically, a gearbox is used to drive the electric generator in response to rotation of the rotor. For instance, the gearbox may be configured to convert a low speed, high torque input provided by the rotor to a high speed, low torque output that may drive the electric generator.

The gearbox generally includes a gearbox housing containing a plurality of gears (e.g., planetary, ring and/or sun gears as well as non-planetary gears) connected via one or more planetary carriers and bearings for converting the low speed, high torque input of the rotor shaft to a high speed, low torque output for the generator. In addition, each of the gears rotates about a pin shaft arranged within the one or more planetary carriers. Further, the drivetrain generally includes a plurality of bearings arranged with the rotor shaft, the pin shafts, and/or the high-speed shaft of the generator. Moreover, lubrication is generally provided between the various bearing(s) and the rotating components.

Conventional bearings are typically fabricated by forming one or more stock materials into a cylindrical shape that can be mounted onto a respective shaft with an interference fit as well as a bolted assembly.

Such bearings require compliance to counter the deformation which occurs due to the deformation of the parts surrounding the bearings. For conventional bearings, extra components are added thereto so as to increase the flexibility thereof. More specifically, conventional bearings include gliding pads, pivot joints, steel springs, and/or flexible geometry designs to compensate for misalignment, dynamic movements, and/or deflection of the rotating shafts versus the deflecting housing structure of the bearing. Without this flexibility, high edge loading and seizure of the bearings can occur. Such components, however, add to the complexity of the bearing design.

Accordingly, a drivetrain for a wind turbine having one or more journal bearings that address the aforementioned issues would be welcomed in the art.

BRIEF DESCRIPTION

Aspects and advantages of the invention will be set forth in part in the following description, or may be obvious from the description, or may be learned through practice of the invention.

In one aspect, the present disclosure is directed to a bearing assembly for a drivetrain of a wind turbine. The bearing assembly includes at least one shaft having a circumferential outer surface and a bearing secured circumferentially around the circumferential outer surface of the shaft(s). Further, the bearing assembly includes an elastomer support arranged on at least one of an inner surface or an outer surface of the bearing. The elastomer support is constructed, at least in part, of an elastomeric material.

In one embodiment, the elastomer support may be secured to the inner surface of the bearing and may have a generally arcuate shape.

In another embodiment, the elastomer support may be further constructed, at least in part, of at least one reinforcement material. For example, in one embodiment, the reinforcement material(s) may include a fiber material and/or a metal mesh. In such embodiments, the fiber material may include glass fibers, carbon fibers, metal fibers, polymer fibers, ceramic fibers, nanofibers, or combinations thereof In an embodiment, one or more strands of the at least one reinforcement material are arranged at an angle with respect to the inner surface of the bearing. For example, in one embodiment, the angle may be equal to or greater than about 90 degrees with respect to the inner surface of the bearing. Alternatively, the angle may be less than about 90 degrees with respect to the inner surface of the bearing.

In further embodiments, one or more strands of the at least one reinforcement material may be arranged away from a centerline of the bearing.

In additional embodiments, the elastomer support may further include one or more voids or one or more through holes.

In several embodiments, the bearing may be a journal bearing. In yet another embodiment, the shaft(s) may be a pin shaft, a low-speed shaft, or a high-speed shaft of the drivetrain.

In another aspect, the present disclosure is directed to a drivetrain assembly. The drivetrain assembly includes a low-speed shaft, a gearbox comprising a gearbox housing and a gear assembly configured within the gearbox housing and a generator rotatably coupled to the gearbox via a high-speed shaft. The gear assembly includes a plurality of gears each rotatably mounted to a respective pin shaft. In addition, the drivetrain assembly includes one or more bearings arranged with a circumferential outer surface of at least one of the low-speed shaft, the high-speed shaft, or one or more of the pin shafts. The bearing(s) include an elastomer support arranged on an inner surface thereof. The elastomer support is constructed, at least in part, of an elastomeric material.

In yet another aspect, the present disclosure is directed to a method for manufacturing a bearing for a wind turbine. The method includes forming a bearing body of a bearing material. The bearing body has an inner surface and an outer surface separated by a thickness. The method also includes forming at least one elastomer support of an elastomeric material. The elastomeric material is reinforced via at least one reinforcement material. The method also includes providing the at least one elastomer support adjacent to the inner surface of the bearing. It should also be understood that the gearbox assembly may further include any of the additional features described herein.

In one embodiment, forming the elastomer support(s) of the elastomeric material may include shaping the reinforcement material into an arcuate shape and embedding the reinforcement material in the elastomeric material via a molding process. It should also be understood that the method may further include any of the additional steps and/or features described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
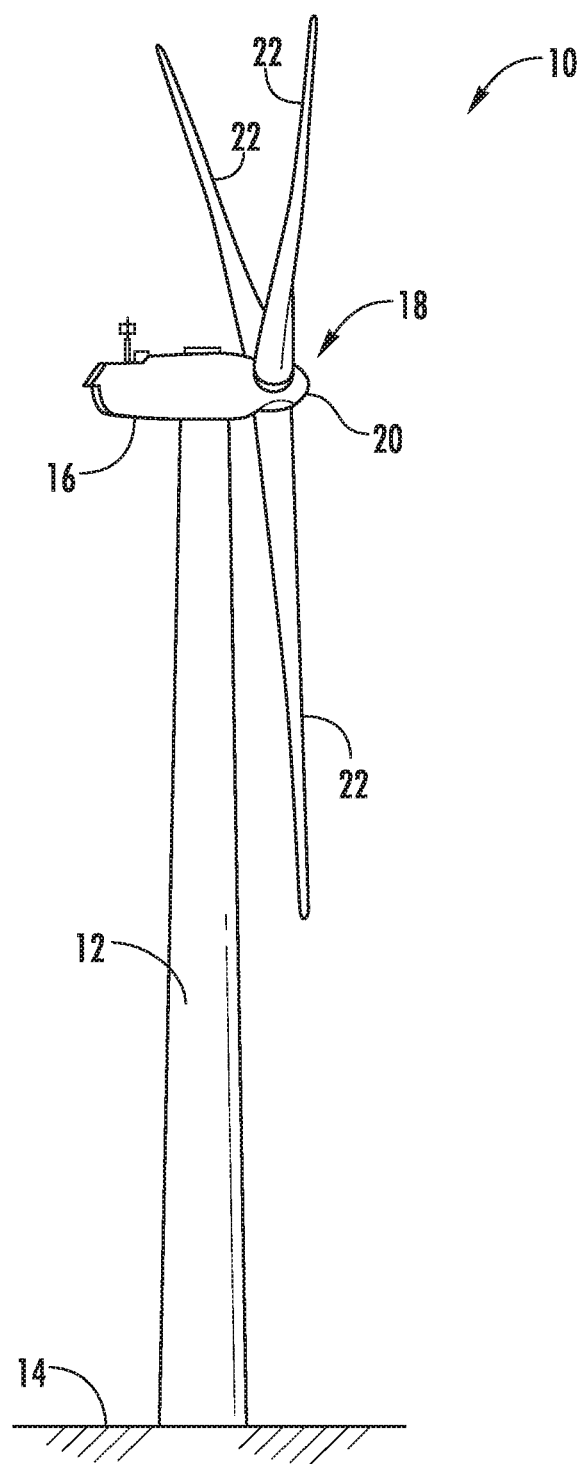
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a drivetrain assembly that includes one or more journal bearings with an elastomer backing such that the needed deflection can be obtained by the specific elastomer material properties. The different thermal expansion coefficient of the elastomer in comparison to the bearing material (e.g. steel) can further be compensated by integrating reinforced structures inside the elastomer by providing free space for the elastomer thermal expansion.

Thus, the present disclosure provides many advantages not present in the prior art. For example, the elastomer material provides the needed flexibility without additional parts to compensate for deflections of the surrounding parts. Accordingly, the journal bearings of the present disclosure are less complex and less expensive as compared to conventional journal bearings.

Referring now to the drawings, FIG. 1 illustrates a perspective view of one embodiment of a wind turbine 10 according to the present disclosure. As shown, the wind turbine 10 includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

Figure 2:
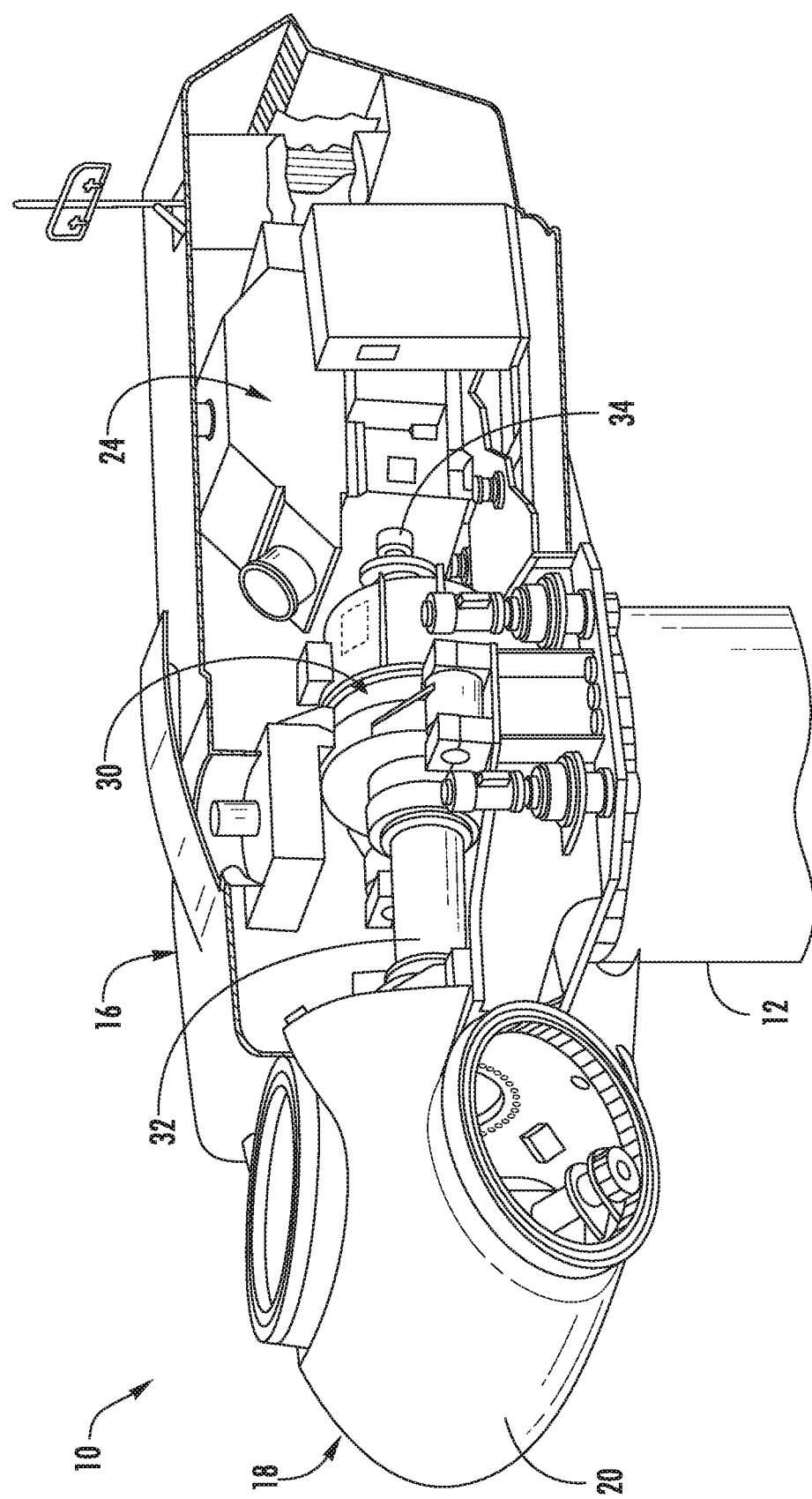
FIG. 2 illustrates a detailed, internal view of one embodiment of a nacelle of a wind turbine according to the present disclosure.

Referring now to FIG. 2, a simplified, internal view of a nacelle 16 of the wind turbine 10 according to conventional construction is illustrated. As shown, the generator 24 may be disposed within the nacelle 16. In general, the generator 24 may be coupled to the rotor 18 of the wind turbine 10 for producing electrical power from the rotational energy generated by the rotor 18. For example, as shown in the illustrated embodiment, the rotor 18 may include a rotor shaft 32 coupled to the hub 20 for rotation therewith. The rotor shaft 32 may, in turn, be rotatably coupled to a drivetrain assembly that includes the generator 24 and a gearbox assembly 30. More specifically, the rotor shaft 32 may, in turn, be rotatably coupled to a generator shaft 34 of the generator 24 through the gearbox assembly 30.

As is generally understood, the rotor shaft 32 may provide a low speed, high torque input to the gearbox assembly 30 in response to rotation of the rotor blades 22 and the hub 20. The gearbox assembly 30 may then be configured to convert the low speed, high torque input to a high speed, low torque output to drive the generator shaft 34 and, thus, the generator 24. In alternative embodiments, the rotor shaft 32 may be eliminated and the rotatable hub 20 may be configured to turn the gears of the gearbox assembly 30, rather than requiring a separate rotor shaft 32.

Figure 3:
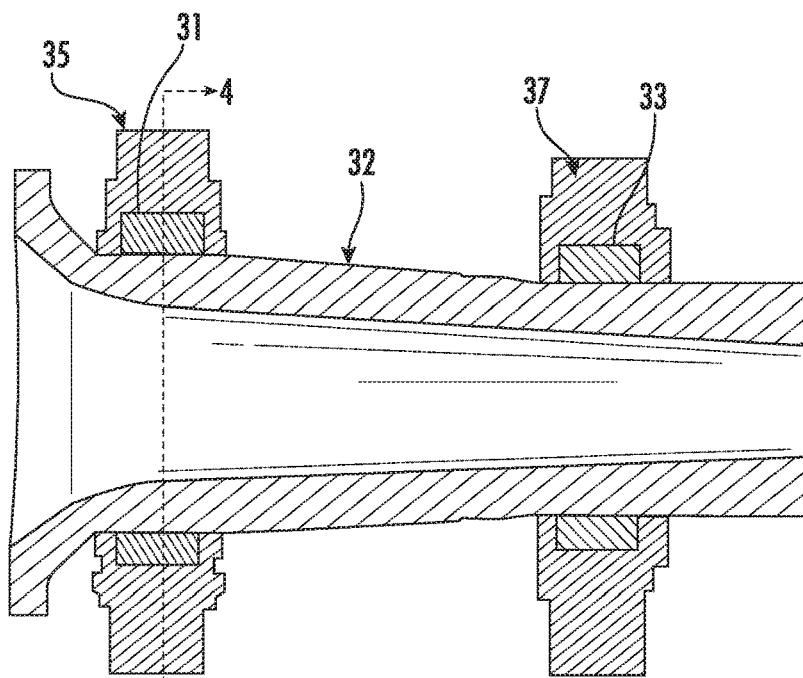
FIG. 3 illustrates a side view of one embodiment of a rotor shaft of a wind turbine according to the present disclosure, particularly illustrating a plurality of bearing engaged with the main shaft.
Figure 4:
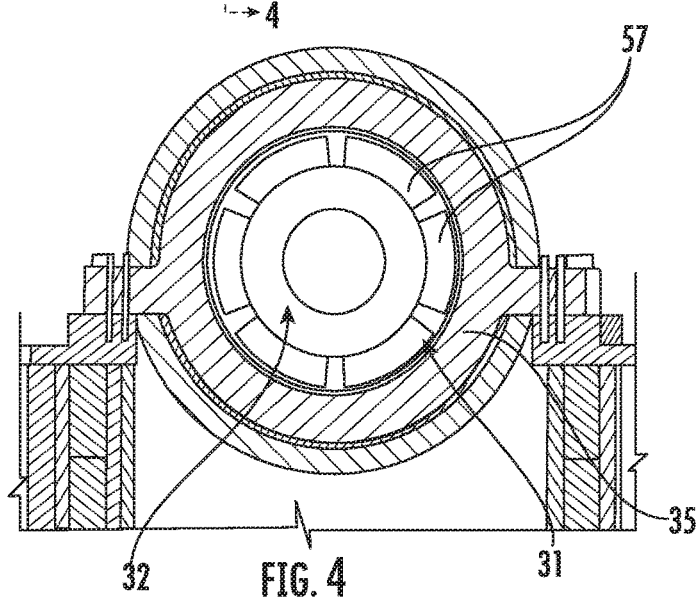
FIG. 4 illustrates a cross-sectional view of one embodiment of a rotor shaft of a wind turbine according to the present disclosure, particularly illustrating a plurality of bearing engaged with the main shaft.
Figure 5:
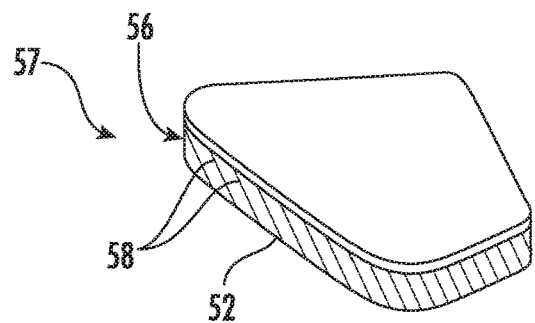
FIG. 5 illustrates a perspective view of one embodiment of a bearing segment of a bearing for a drivetrain of a wind turbine according to the present disclosure.

Referring now to FIGS. 3 and 4, a side view and a cross-sectional view of one embodiment of the rotor shaft 32 according to the present disclosure are illustrated. More specifically, as shown, the rotor shaft 32 is typically supported via a plurality of bearings, e.g. at least a first bearing 31 and a second bearing 33. Further, as shown, the first and second bearings 31, 33 may be contained with first and second bearing housings 35, 37, respectively. For example, as shown in FIG. 4, a cross-sectional view of the rotor shaft 32 of FIG. 3 along line 4-4 through the first bearing housing 35 is illustrated. Thus, as shown, the first bearing 31 may be formed of a plurality of arcuate bearing segments 57 arranged together in a ring shape to substantially match the circumferential outer surface of the rotor shaft 32. More specifically, as shown in FIG. 5, a perspective view of one of the bearing segments 57 is illustrated according to the present disclosure, details of which are discussed below.

Figure 6:
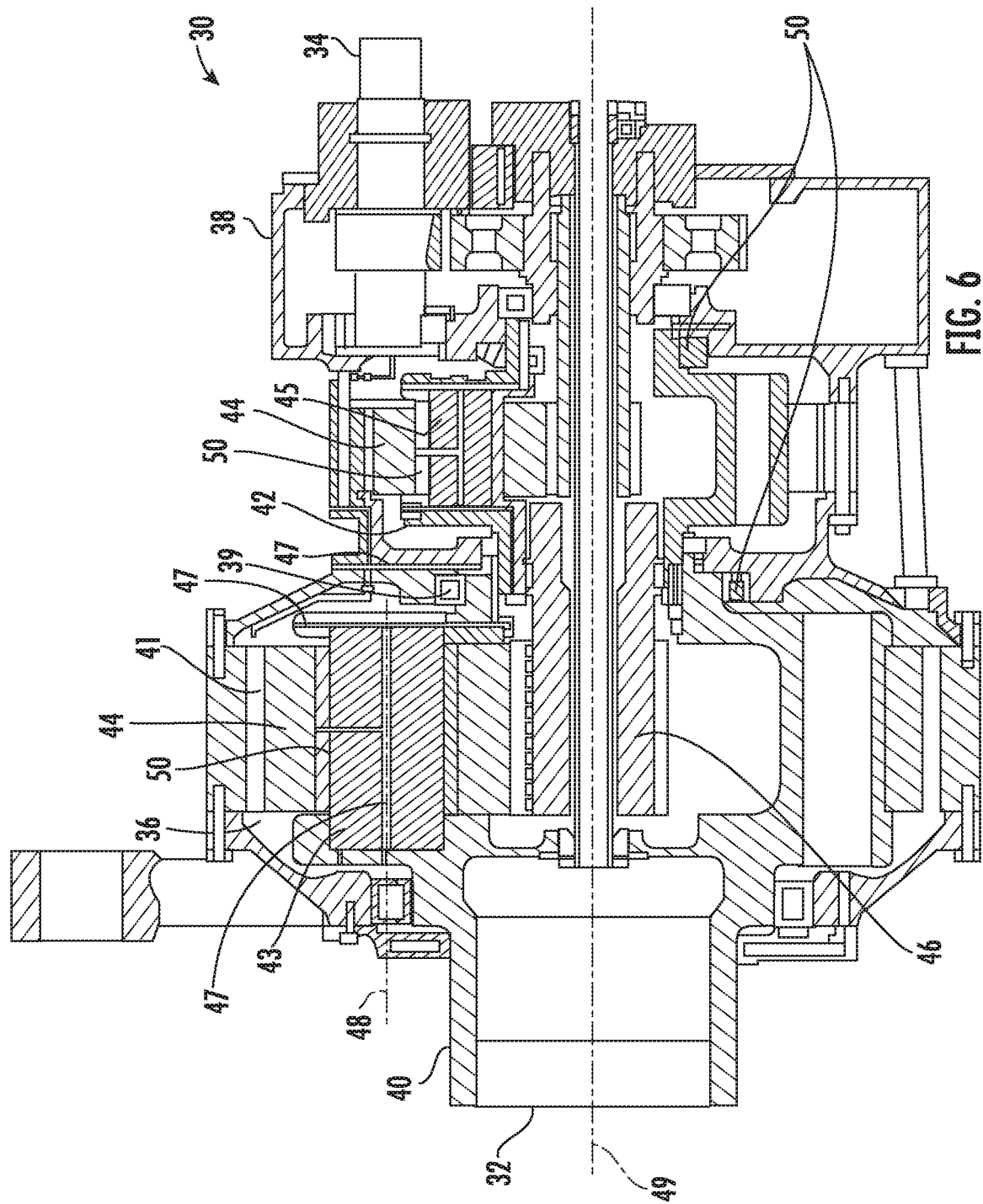
FIG. 6 illustrates a cross-sectional view of one embodiment of a gearbox assembly of a wind turbine according to the present disclosure.

Referring now to FIG. 6, a cross-sectional view of a gearbox assembly 30 for converting the low speed of the rotor shaft 32 to a high speed, low torque output for the generator 24 according to the present disclosure is illustrated. As shown, the gearbox assembly 30 includes a gear assembly 36 housed within a gearbox housing 38. More specifically, the gear assembly 36 includes a plurality of gears (e.g., planetary, ring, sun, helical, and/or spur gears) and bearings 39 for converting the low speed, high torque input of the rotor shaft 32 to a high speed, low torque output for the generator 24. For example, as shown, the input shaft 32 may provide an input load to the gear assembly 36 and gear assembly 36 may provide an output load to the generator 24 (FIG. 2) as is generally known in the art. Thus, during operation, input load at an input rotational speed is transmitted through the gear assembly 36 and provided as output load at output rotational speed to the generator 24.

Figure 7:
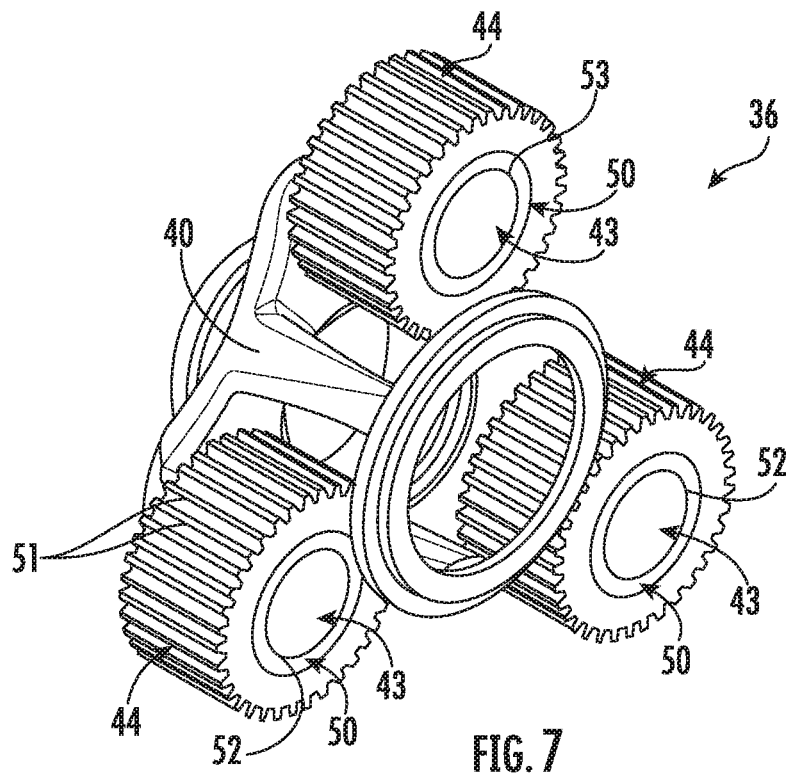
FIG. 7 illustrates a perspective view of one embodiment of a gear assembly of a gearbox of a wind turbine according to the present disclosure.

Further, as shown in FIGS. 6 and 7, the gear assembly 36 may include a first planetary carrier 40 and a second planetary carrier 42 operatively coupling a plurality of gears. Moreover, as shown, the gear assembly 36 may include, at least, a ring gear 41, one or more planet gears 44, a sun gear 46, one or more first pin shafts 43, and one or more second pin shafts 45. For example, in several embodiments, the gear assembly 36 may include one, two, three, four, five, six, seven, eight, or more planet gears 44. Further, as shown particularly in FIG. 6, each of the gears (such as planet gears 44) may include a plurality of teeth 51. In such embodiments, the teeth 51 may be sized and shaped to mesh together such that the various gears 41, 44, 46 engage each other. For example, the ring gear 41 and the sun gear 46 may each engage the planet gears 44. In addition, it should be understood that the gears 41, 44, 46 described herein may include any suitable type of gears, including but not limited to spur gears, face gears, helical gears, double helical gears, or similar.

In some embodiments, one or both of the planetary carriers 40, 42 may be stationary. In these embodiments, the input shaft 32 may be coupled to the ring gear 41, and input loads on the input shaft 32 may be transmitted through the ring gear 41 to the planet gears 44. Thus, the ring gear 41 may drive the gear assembly 36. In other embodiments, the ring gear 41 may be stationary. In these embodiments, the input shaft 32 may be coupled to the planetary carriers 40, 42, and input loads on the input shaft 32 may be transmitted through the planetary carriers 40, 42 to the planet gears 44. Thus, the planetary carriers 40, 42 may drive the gear assembly 36. In still further embodiments, any other suitable component, such as the planet gear 44 or the sun gear 46, may drive the gear assembly 36.

Still referring to FIG. 6, the sun gear 46 defines a central axis 49, and thus rotates about this central axis 49. The ring gear 41 may at least partially surround the sun gear 46, and be positioned along the central axis 49. Further, the ring gear 41 may (if rotatable) thus rotate about the central axis 49. Each of the planet gears 44 may be disposed between the sun gear 46 and the ring gear 41, and may engage both the sun gear 46 and the ring gear 41. For example, the teeth of the gears may mesh together, as discussed above. Further, each of the planet gears 44 may define a central planet axis 48, as shown. Thus, each planet gear 44 may rotate about its central planet axis 48. Additionally, the planet gears 44 and central planet axes 48 thereof may rotate about the central axis 49.

The gearbox assembly 30 may also include a lubrication system or other means for circulating oil throughout the gearbox components. For example, as shown in FIG. 6, the gearbox assembly 30 may include a plurality of oil passages 47 that are configured to transfer oil therethrough. As is generally understood, the oil may be used to reduce friction between the moving components of the gearbox assembly 30 and may also be utilized to provide cooling for such components, thereby decreasing component wear and other losses within the gearbox assembly 30 and increasing the lifespan thereof. In addition, the oil may contain properties that prevent corrosion of the internal gearbox components.

Figure 8:
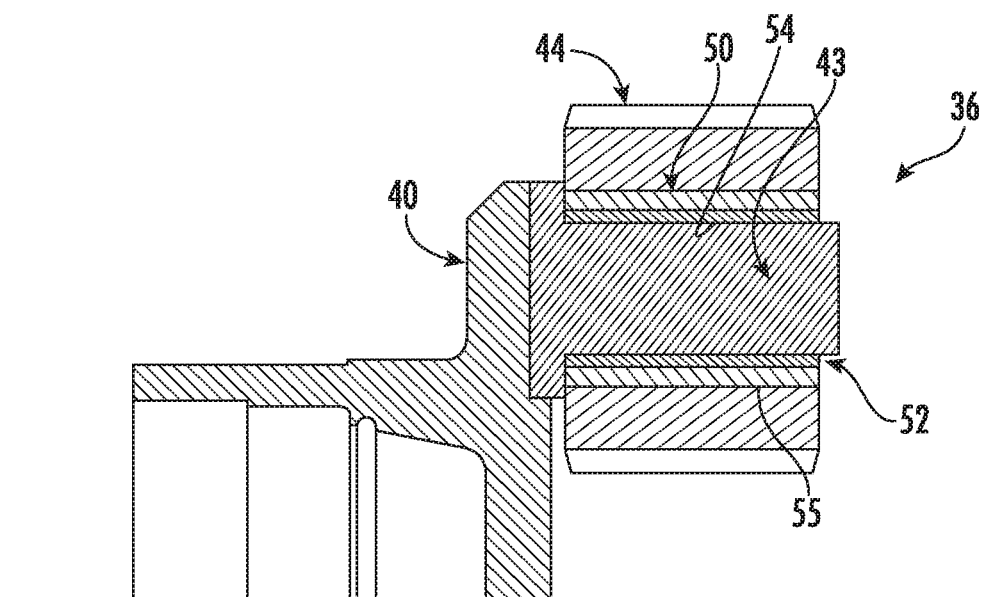
FIG. 8 illustrates a side, cross-sectional view of one embodiment of a gear assembly of a gearbox of a wind turbine according to the present disclosure.
Figure 9:
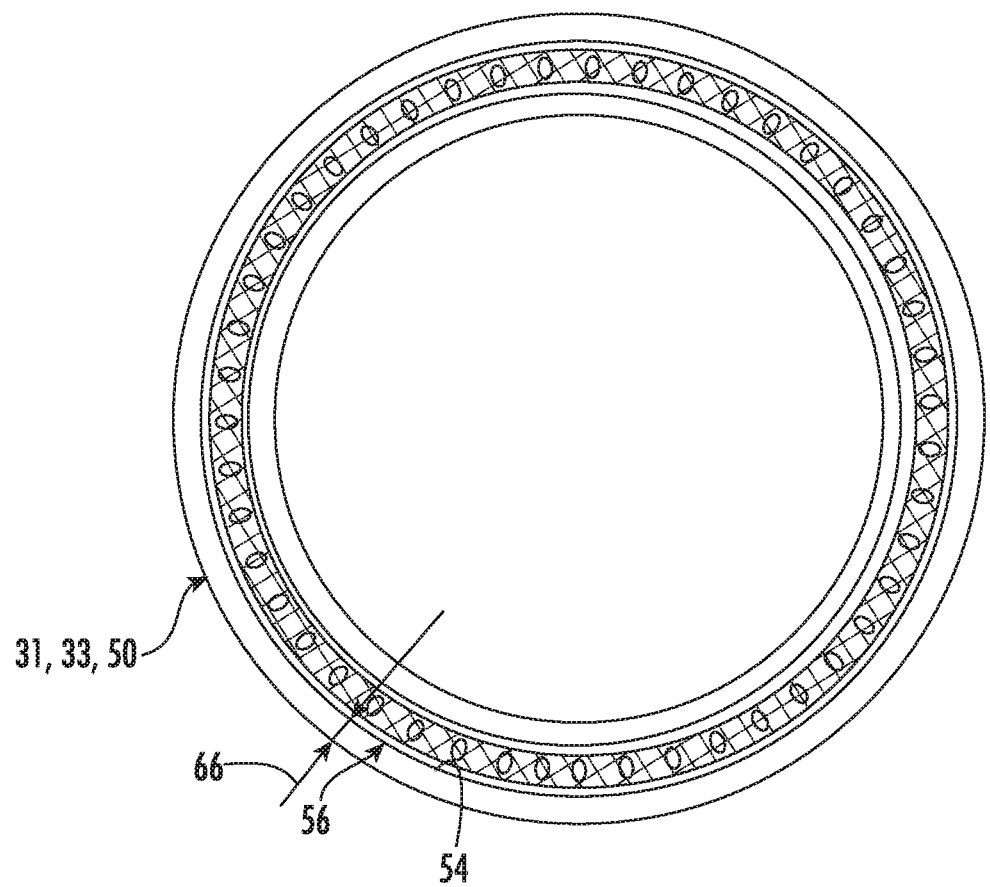
FIG. 9 illustrates a front view of one embodiment of a bearing for a gear assembly of a gearbox of a wind turbine according to the present disclosure, particularly illustrating an elastomer support arranged adjacent to an inner surface of the bearing.
Figure 10:
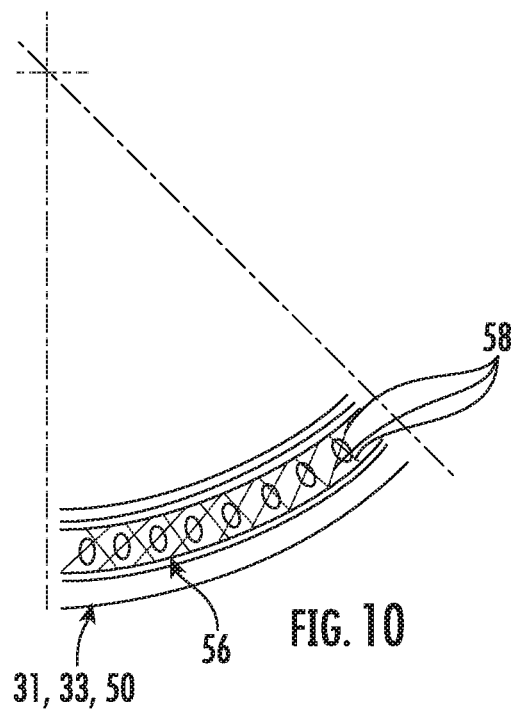
FIG. 10 illustrates a detailed, partial view of the bearing illustrated in FIG. 9.

Referring to FIGS. 7 and 8, partial, detailed views of the gear assembly 36 are illustrated according to the present disclosure. For example, FIG. 7 illustrates a partial, perspective view of the gear assembly 36, with a portion of one of the planet gears 44 removed to illustrate internal components thereof. FIG. 8 illustrates a partial, side view of the gear assembly 36. More specifically, as shown, the gear assembly 36 includes, at least, the pin shaft 43, a bearing 50 mounted circumferentially onto the pin shaft 43, e.g. via a circumferential outer surface 53 of the pin shaft 43, and the planet gear 44 mounted circumferentially onto the bearing 50.

Accordingly, in certain embodiments, the bearings 31, 33, 50 of the drivetrain assembly described herein may correspond to journal bearings, thrust bearings, axial bearings, and/or radial bearings. Accordingly, in certain embodiments, the bearings 31, 33, 50 may be placed (e.g. by sliding, securing, mounting, or printing) or otherwise added onto the rotor shaft 32, the high speed shaft 34, and/or the various pin shafts 43, 45. In another embodiment, the bearings 31, 33, 50 may be constructed of a metal or metal alloy, including, for example, a copper alloy (e.g. bronze) and/or polyetheretherketone (PEEK). Thus, the bearings 31, 33, 50 may provide improved wear characteristics under loading (especially at startup and shutdown, when an oil film may be insufficient to separate the rotating and non-rotating surfaces).

Referring particularly to FIGS. 5 and 8-11D, the bearings 31, 33, 50 may further includes an elastomer support 52 secured to at least one of an inner surface 54 or an outer surface 55 of the bearings 31, 33, 50. More specifically, as shown particular in FIG. 8, the elastomer support 52 may be secured to the inner surface 54 of the bearings 31, 33, 50. In addition, as shown, the elastomer support 52 may have a generally arcuate shape. In additional embodiments, the elastomer support 52 may be constructed, at least in part, of an elastomeric material, such as rubber or silicon, so as to provide flexibility to the bearings 31, 33, 50.

Referring particularly to FIGS. 5 and 9-11D, the elastomer support 52 may be further constructed, at least in part, of at least one reinforcement material 56. As such, the reinforcement material(s) 56 are configured to counteract the linear expansion of the elastomer support 52 when temperature rises. Thus, the desire for the elastomer support 52 to expand will be converted into strain.

For example, in one embodiment, the reinforcement material(s) 56 may include a fiber material and/or a metal mesh having a plurality of strands 58 arranged together within the elastomer support 52. In such embodiments, the fiber material may include glass fibers, carbon fibers, metal fibers, polymer fibers, ceramic fibers, nanofibers, or combinations thereof.

Figure 11D:
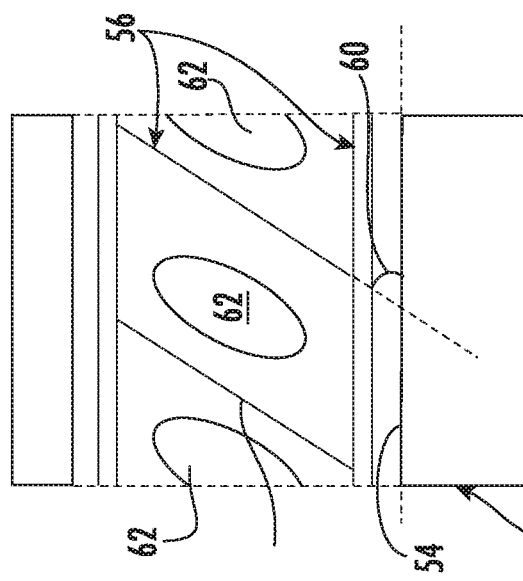
FIG. 11D illustrates a partial, front view of one embodiment of another embodiment of a room temperature bearing/elastomer support without loading.
Figure 11C:
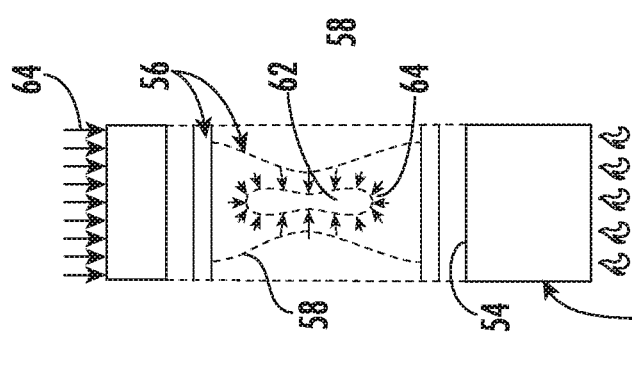
FIG. 11C illustrates a partial, front view of one embodiment of an elevated temperature bearing/elastomer support with loading according to the present disclosure.
Figure 11B:
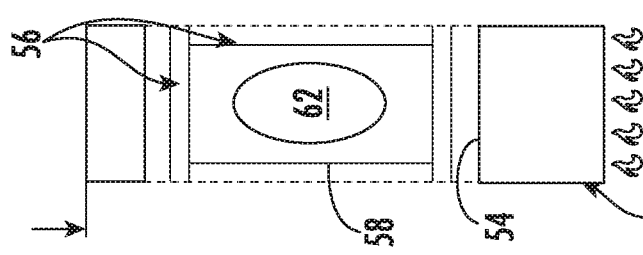
FIG. 11B illustrates a partial, front view of one embodiment of an elevated temperature bearing/elastomer support without loading according to the present disclosure, particularly illustrating how the bearing/elastomer support has expanded from the rising temperatures.
Figure 11A:
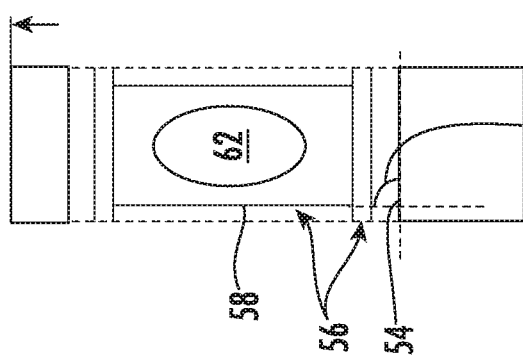
FIG. 11A illustrates a partial, front view of one embodiment of a room temperature bearing/elastomer support without loading according to the present disclosure.

Referring particularly to FIG. 11A, in one embodiment, one or more of the strands 58 of the reinforcement material 56 may be arranged at an angle 60 with respect to an inner surface of the respective bearing 31, 33, 50. For example, as shown, the angle 60 may be equal to about 90 degrees with respect to the inner surface 54 of the respective bearing 31, 33, 50. Alternatively, as shown in FIG. 11D, the angle 60 may be less than about 90 degrees with respect to the inner surface 54 of the respective bearing 31, 33, 50.

In further embodiments, one or more of the strands 58 of the reinforcement material 56 may be arranged away from a centerline of the respective bearing 31, 33, 50. By arranging the strands 58 away from the centerline of the remaining material, the sideways motion of the material will buckle the strand(s) 58 and avoid the respective bearing 31, 33, 50 from taking compression stress. Therefore, in such instances, the off-center strand(s) 58 are configured to act like a chain or rope.

Referring to FIGS. 9-11D, the elastomer support 52 may further include one or more voids 62 or one or more through holes. Since typically elastomer material is incompressible, the voids/holes 62 provide free space for the elastomeric material to spread out and/or to avoid growing in thickness in a lateral and/or a radial direction. Otherwise, the material would have to be compressed against the bulk modulus of the material.

Therefore, as shown in FIGS. 11A-11D, partial, front views of the bearing 31, 33, 50 and elastomer support 52 are illustrated in differing configurations. As shown in FIG. 11A, a partial, front view of one embodiment of a room temperature bearing/elastomer support 52 without loading is illustrated. FIG. 11D illustrates a partial, front view of one embodiment of another embodiment of a room temperature bearing/elastomer support 52 without loading. As shown in FIG. 11B, a partial, front view of one embodiment of an elevated temperature bearing 50/elastomer support 52 without loading is illustrated, particularly illustrating how the bearing/elastomer support 52 has expanded from the rising temperatures. As shown in FIG. 11C, a partial, front view of one embodiment of an elevated temperature bearing/elastomer support 52 with loading (as indicated by the arrows 64) is illustrated. More specifically, as shown, one or more of the voids 62 within the elastomer support 52 deflect due to the elevated temperatures and the loading. In addition, as shown, one or more of the strands 58 also deflect due to the elevated temperatures and the loading.

Figure 12:
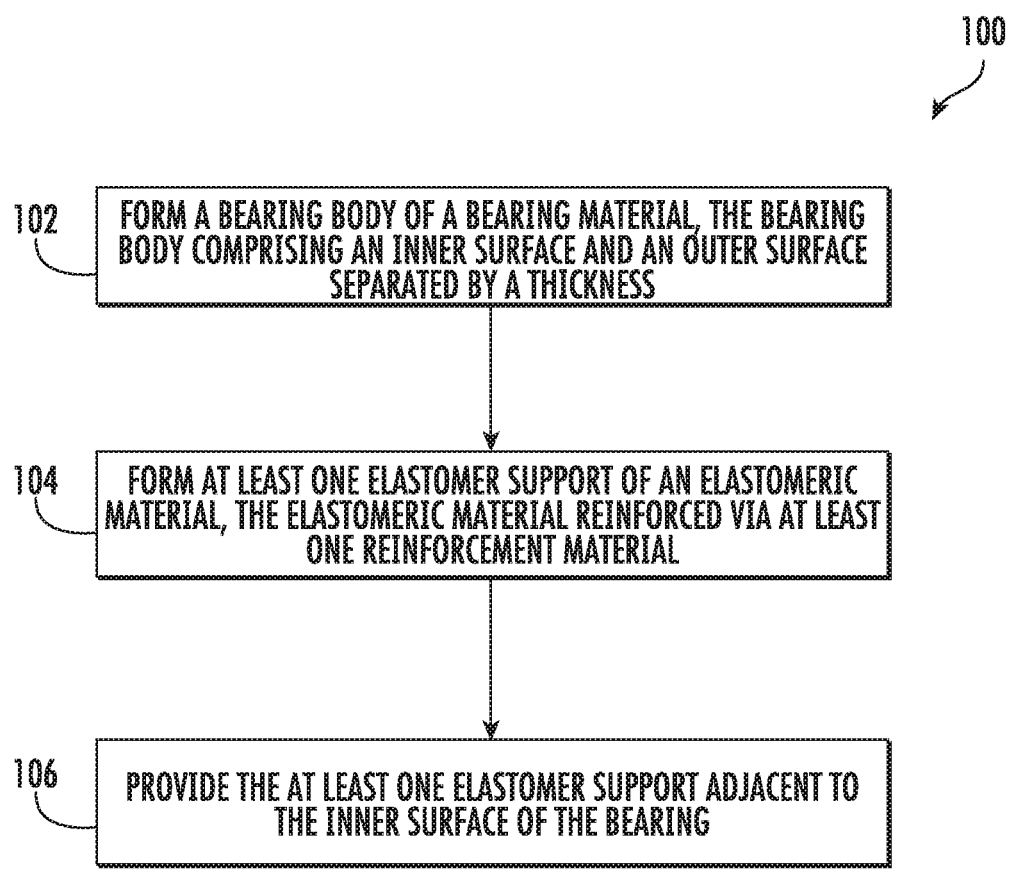
FIG. 12 illustrates a flow diagram of one embodiment of a method for manufacturing a journal bearing for a wind turbine according to the present disclosure.

Referring now to FIG. 12, a flow diagram of one embodiment of a method 100 for manufacturing a bearing for a wind turbine according to the present disclosure is illustrated. In general, the method 100 described herein generally applies to operating the wind turbine 10 described above. However, it should be appreciated that the disclosed method 100 may be implemented using any other suitable wind turbine. Further, FIG. 12 depicts steps performed in a particular order for purposes of illustration and discussion.

Those of ordinary skill in the art, using the disclosures provided herein, will understand that various steps of any of the methods disclosed herein can be adapted, omitted, rearranged, or expanded in various ways without deviating from the scope of the present disclosure.

As shown at (102), the method 100 includes forming a bearing body 50 of a bearing material. For example, as shown in FIG. 6, the bearing body 50 has an inner surface 54 and an outer surface 56 separated by a thickness 66. As shown at (104), the method 100 includes forming at least one elastomer support 52 of an elastomeric material. As mentioned, the elastomeric material is also reinforced via at least one reinforcement material 56. Thus, in certain embodiments, the elastomer support 52 may be formed by shaping the reinforcement material 56 into an arcuate shape and embedding the reinforcement material 56 in the elastomeric material via a molding process, e.g. such as injection molding. As shown at (106), the method 100 includes providing the elastomer support(s) 52 adjacent to the inner surface 54 of the bearing 31, 33, 50 so as to counter deformation which occurs due to the deformation of the parts surrounding the bearing 31, 33, 50.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A drivetrain assembly, comprising:
   a low-speed shaft;
   a gearbox comprising a gearbox housing and a gear assembly configured within the gearbox housing, the gear assembly comprising a plurality of gears each rotatably mounted to a respective pin shaft;
   a generator rotatably coupled to the gearbox via a high-speed shaft,
   one or more bearings arranged with a circumferential outer surface of at least one of the low-speed shaft, the high-speed shaft, or one or more of the pin shafts, the one or more bearings comprising an elastomer support arranged on an inner surface thereof; and
   the elastomer support formed of an elastomeric material and a separate reinforcement material embedded therein.

2. The drivetrain assembly of claim 1, wherein the at least one reinforcement material comprises at least one of a fiber material or a metal mesh, the fiber material comprising at least one of glass fibers, carbon fibers, metal fibers, polymer fibers, ceramic fibers, nanofibers, or combinations thereof.

3. The drivetrain assembly of claim 1, wherein the reinforcement material comprises one or more strands of material embedded in the elastomeric material and arranged at an angle with respect to the inner surface of the bearing.

4. The drivetrain assembly of claim 3, wherein the angle ranges from about 0 degrees to about 90 degrees with respect to the inner surface of the bearing.

5. The drivetrain assembly of claim 3, wherein one or more strands of the at least one reinforcement material are arranged away from a centerline of the bearing.

6. The drivetrain assembly of claim 1, wherein the elastomer support comprises one or more voids or one or more through holes.

7. The drivetrain assembly of claim 1, wherein the elastomeric material comprises one of rubber or silicon.

8. The drivetrain assembly of claim 1, wherein the elastomer support is secured to the inner surface of the bearing and comprises a generally arcuate shape.

9. The drivetrain assembly of claim 1, wherein the elastomer support is secured to the inner surface of the bearing and comprises a generally arcuate shape.

\* \* \* \* \*